United States Patent Office 2,861,992
Patented Nov. 25, 1958

2,861,992

DERIVATIVES OF QUERCETIN AND TO PROCESSES FOR THEIR PREPARATION

Pierre E. Chabrier de Lassauniere, Paris, France, assignor to Recherches et Techniques Appliquées (Société Anonyme), Casablanca, Morocco, a company of Morocco No Drawing. Application August 3, 1956
Serial No. 602,073

Claims priority, application France August 29, 1955

5 Claims. (Cl. 260—247.7)

This invention relates to derivatives of quercetin and to processes for their preparation.

Of the flavone derivatives endowed with vitamin P activity, 5:7:3':4'-tetrahydroxy flavonol, known by the short name quercetin, is particularly interesting, since its activity is almost double that of its glucorhamnoside, rutin. However, in therapeutical applications it has the disadvantage of being of very low solubility in water so that it cannot be used directly for the preparation of aqueous solutions for injection.

According to the present invention there are provided new derivatives of quercetin being the β-tertiary amino ethyl mono-ethers of quercetin and the acid addition salts thereof containing non-toxic anions and the quaternary ammonium compounds thereof. More particularly according to the invention there are provided new derivatives of quercetin of the general formula:

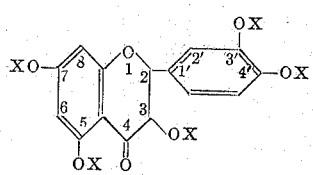

wherein one of the symbols X represents a grouping of the formula:

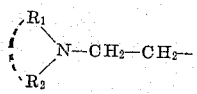

and the other symbols X represent hydrogen atoms, the grouping

representing a di-(lower alkyl) amino group or a five-membered or six-membered heterocyclic amino group, and the acid addition salts thereof containing non-toxic anions and the quaternary ammonium compounds thereof.

Specific such compounds are the β-diethylamino ethyl mono-ether of quercetin, the β-morpholinoethyl mono-ether of quercetin and the acid addition salts and quaternary compounds of these.

The basic ethers themselves are at best only very sparingly soluble in water and are therefore, more conveniently employed in therapy in solid form, e. g. as an active substance in tablets.

The preferred compounds however are the salts of the basic ethers and the water-soluble quaternary derivatives thereof, for example the ascorbates and the methiodides, since these can be employed in the form of aqueous solutions, if desired with an addition of ascorbic acid.

Particularly important compounds are the β-morpholinylethyl mono-ether of quercetin and the ascorbate and the methiodide of this basic ether. Their activity in regard to capillary permeability is substantially double that of rutin.

The basic ethers may be prepared by any method resulting in the replacement of the hydrogen of one of the hydroxyl groups of the quercetin by the β-tert.-aminoethyl radical. Preferably quercetin dissolved in an alkali solution is heated with an excess of a hydrohalide salt of a β-tert.-aminoethyl halide, in an inert atmosphere, and the product of the reaction is neutralised, whereupon the required ether and unreacted quercetin are precipitated. The β-tert.-aminoethyl mono-ether is then separated from the unreacted quercetin, for example by extraction by means of a selective solvent. Instead of using the hydrohalide salt of a β-tert.-aminoethyl halide, it is possible to use the β-tert.-aminoethyl halide itself but this is generally less convenient since, for example, β-morpholinyl-ethyl chloride is a very powerful vesicant which must be handled with care.

The acid addition salts and the quaternary compounds of the basic mono-ethers can be prepared by methods known per se, e. g. by direct action of the selected acid or of the appropriate ester, e. g. alkyl halide, on the basic mono-ether, in a mutual solvent for the two reactants. Where an acid addition salt is required it is not necessary to isolate the basic ether; thus the acid may be reacted, in an aqueous medium, with the crude product of the etherification, which though it has previously been filtered and washed, still contains uncombined quercetin. An aqueous solution of the required salt and a quercetin precipitate are thus obtained and the quercetin may be separated, e. g. by treatment with a selective solvent.

The following examples will serve to illustrate the invention but are not to be regarded as limiting it in any way:

EXAMPLE I

*β-Morpholinylethyl mono-ether of quercetin*

In a three-necked spherical flask having a capacity of 1 litre and provided with a mechanical agitator are suspended 33.8 g. of quercetin monohydrate (0.1 g. mol) in 300 cc. of water.

The mixture is brought to 70° C. by heating on a water bath and a brisk stream of nitrogen passed into it. There is then added, with continuous agitation of the mixture, 48 cc. of a 10% caustic soda solution (0.1 g. mol plus 20% excess).

The mixture is heated at 80° C. for 30 minutes. A solution of 22.4 g. (0.1 g. mol plus 20% excess) of the hydrochloride of β-morpholino-ethyl chloride in 48 cc. of 10% caustic soda (0.1 g. mol plus 20% excess) is then added to the mixture. The mixture is heated and stirred at 80° to 90° C. for 2 hours in an atmosphere of nitrogen.

The solution is then allowed to cool and its pH is adjusted to 7 by acidification with 15% hydrochloric acid.

A mixture of the β-morpholinylethyl mono-ether formed and of the unreacted quercetin precipitates, while the sodium chloride formed remains in solution. This precipitate is filtered off, washed several times with water and then dried.

The monoether is then extracted from the precipitate with 2 x 200 cc. of boiling acetone, filtered to separate the quercetin (insoluble in acetone) and the solvent driven off from the filtrate by distillation on a water bath, the last traces being removed in vacuo.

26 g. (yield of 62.5%) of β-morpholinylethyl mono-ether of quercetin are recovered in the form of a yellow, very friable water-insoluble powder, which is sparingly soluble in cold ethyl alcohol, fairly soluble in hot ethyl alcohol and insoluble in diethyl ether. Its melting point is 205° C.

*Analysis.*—Percent N calculated=3.37. Percent N found=3.45.

EXAMPLE II

*β-Diethylaminoethyl mono-ether of quercetin*

The procedure of Example I is followed, replacing the β-morpholinylethyl chloride hydrochloride by β-ethylaminoethyl chloride hydrochloride. There is thus obtained, in a yield of 61%, the β-diethylaminoethyl mono-ether of quercetin, which is a brownish yellow powder, insoluble in cold water, slightly soluble in hot water and insoluble in ethyl alcohol and diethyl ether. Its melting point is 225° C.

EXAMPLE III

*Ascorbate of the β-morpholinylethyl mono-ether of quercetin*

To 4.15 g. (0.01 g. mol) of the β-morpholinylethyl ether of quercetin in solution in 50 cc. of methyl alcohol is added 1.76 g. (0.01 g. mol) of ascorbic acid dissolved in 20 cc. of methyl alcohol.

The mixture is brought to boiling point for a few moments, and then filtered. The solvent is driven off from the filtrate by distillation on a water bath, the last traces being removed in vacuo.

5.2 g. (yield of 88%) of the ascorbate of the β-morpholinylethyl mono-ether of quercetin are thus obtained in the form of a yellow powder which is soluble in water and insoluble in alcohol. This compound melts at about 210° C. with decomposition.

*Analysis.*—Percent ascorbic acid calculated: 29.78. Percent ascorbic acid found: 30.90, 30.93. Percent N calculated=2.36. Percent N found=2.39.

EXAMPLE IV

*Ascorbate of the β-diethylaminoethyl mono-ether of quercetin*

This compound is prepared in methyl alcohol, as described in Example III, using the diethylaminoethyl ether instead of the morpholinylethyl ether. It is obtained in a yield of 87% as a yellow powder which is soluble in water, insoluble in cold ethyl alcohol and slightly soluble in hot ethyl alcohol. It melts at about 200° C. with decomposition.

EXAMPLE V

*Methiodide of the β-morpholinylethyl mono-ether of quercetin*

To 4.15 g. (0.01 g. mol) of the β-morpholinylethyl ether of quercetin dissolved in 20 cc. of anhydrous acetone are added 2.1 g. (0.01 g. mol plus 50% excess) of methyl iodide. Almost immediately a yellow sticky precipitate separates from the acetone solution.

The mixture is left for 20 hours at room temperature, the surface solution is decanted, and the sticky mass is then triturated in about 40 cc. of anhydrous acetone.

The methiodide then separates in the form of a yellow solid, which is centrifuged, washed several times with acetone and dried over phosphoric anhydride.

The compound is moderately soluble in water, sparingly soluble in ethyl alcohol and insoluble in acetone and diethyl ether; it melts with decomposition at about 205–210° C.

It will be appreciated that by means of this invention there are provided derivatives of quercetin which are more active than rutin in reducing capillary permeability, are soluble in water and therefore capable of use in aqueous solution and some of which, by reason of their association with ascorbic acid or iodine are of especial value due to the advantage of associating such substances with compounds of vitamin P activity.

I claim:

1. A new derivative of quercetin produced by the process which comprises reacting a chloride selected from the class consisting of β-diethylamino ethyl chloride and β-morpholino ethyl chloride with quercetin in a stirred aqueous alkaline medium under an inert atmosphere at a temperature of 80–90° C., the proportion of said chloride with respect to quercetin being in excess of that required to form a mono-ether of quercetin but less than required to form a di-ether of the same, said medium containing alkali in excess of the proportion required to fix hydrochloric acid as disengaged; cooling the reaction mixture and neutralizing the same, to form a precipitate; and separating the mono-ether from unreacted quercetin in said said precipitate.

2. A product produced by the process defined in claim 1 wherein said chloride is employed in the form of the hydrochloride thereof.

3. A product produced by the process defined in claim 1 including the additional step of selectively extracting the mono-ether with acetone.

4. A product produced by the process defined in claim 1 including the additional step of reacting the mono-ether thus separated with ascorbic acid.

5. A new derivative of quercetin produced by the process which comprises reacting β-morpholinoethyl chloride with quercetin in a stirred aqueous alkaline medium under an inert atmosphere at a temperature of 80°–90° C., the proportion of said chloride with respect to quercetin being in excess of that required to form a mono-ether of quercetin but less than required to form a di-ether of the same, said medium containing alkali in excess of the proportion required to fix hydrochloric acid as disengaged; cooling the reaction mixture and neutralizing the same, to form a precipitate; separating the mono-ether from unreacted quercetin in said precipitate, and quaternising the mono-ether thus separated by treatment with methyliodide.

No references cited.